Patented Feb. 6, 1951

2,540,949

UNITED STATES PATENT OFFICE 2,540,949

POLYMERIZATION OF VINYLCYCLOPROPANE AND ITS HOMOLOGUES AND DERIVATIVES

Jean P. Jones, Bartlesville, Okla., assignor to Phillips Petroleum Company, a corporation of Delaware No Drawing. Application February 25, 1946, Serial No. 650,144

11 Claims. (Cl. 260—80.7)

This invention relates to the production of organic materials of high molecular weight. One embodiment of my invention relates to the production of synthetic materials having the properties of resins. Another embodiment of my invention relates to the preparation of rubber-like products. Further embodiments of my invention relate to products so produced.

The polymerization of butadiene and its homologues, analogues, and derivatives, either alone or in admixture with other unsaturated materials, such as styrene, acrylonitrile, acrylic acid, and the like, to produce resinous or rubber-like products has long been known, and a new industry has developed during the recent war based on such chemical reactions. In accordance with the present invention a new reactant is used in such processes. This reactant is a polymerizable vinylcyclopropane, of which the simplest example is vinylcyclopropane itself.

(1) 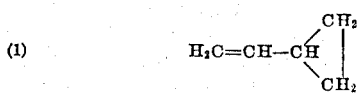

By the term "a polymerizable vinylcyclopropane," I intend to include vinylcyclopropane itself and other individual compounds having the same basic structure and selected from those of its homologues and derivatives which will polymerize with themselves and/or with unsaturated compounds to produce products of higher molecular weight. The reactants I prefer to employ are designated by the formula

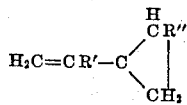

wherein R' is one of the group consisting of hydrogen, methyl, and chlorine, and wherein R" is one of the group consisting of hydrogen, methyl, and ethyl. The more useful reactants are vinylcyclopropane (1) itself and

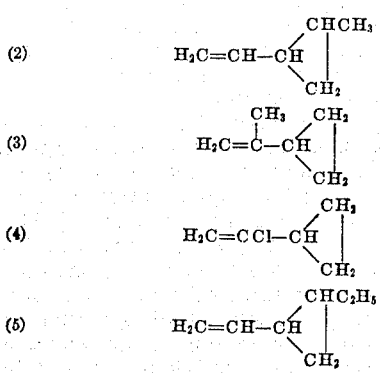

and

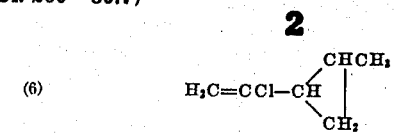

An object of this invention is to produce novel organic products of high molecular weight.

A further object of my invention is to produce synthetic rubber-like products having novel properties.

Another object of my invention is to produce products of high molecular weights from a polymerizable vinylcyclopropane.

Still another object of this invention is to copolymerize vinylcyclopropane and other polymerizable organic compounds.

Further objects and advantages of my invention will become apparent, to one skilled in the art, from the accompanying disclosure and discussion.

The reaction of polymerizable vinylcyclopropanes to produce polymeric materials of higher molecular weight, in accordance with this invention, may be conducted in any one of a number of methods. However, it is to be understood that the product produced by each method has properties which result not only from a choice of reactants but also from a choice of reaction conditions. The polymerizable vinylcyclopropane may be reacted in a substantially pure state, mixed with other polymerizable vinylcyclopropanes, or admixed with other unsaturated reactive organic materials, as will now be discussed. In any case, various small amounts of inert diluents, such as a paraffinic hydrocarbon, may be present in small amounts but should be kept at a minimum to avoid uneconomical operations. In the appended claims, a process which comprises polymerizing a polymerizable vinylcyclopropane includes both (a) polymerizing said compound by itself as the sole monomer and (b) polymerizing same together with other polymerizable materials.

In one embodiment of my invention a polymerizable vinylcyclopropane is reacted with a tertiary-base olefin, preferably one having not more than 7 carbon atoms per molecule. The most common example of such an olefin is isobutylene, although often 2-methylpentene-1, 2-ethylpentene-1, and 2-methylhexene-1 may also be used. In such reactions it is preferred that a polymerization catalyst of the Friedel-Crafts type be employed and a low reaction temperature be employed, preferably below 0° F. and still more preferably between about —50 and about —250° F. It is preferred that the molar ratio of tertiary-base olefin to polymerizable vinylcyclopropane be between about 200:1 and 5:1 with a preferred ratio between about 100:1 and 10:1. Along with a polymerizable vinylcyclopropane in such reactions may be employed a diolefin hydrocarbon, such as butadiene, isoprene, piperylene or the like, in which instances the molar ratio of tertiary-base olefin to other reactants will be within the limits just recited. There may also be included in the reaction mixture, along with or in place of the diolefin hydrocarbon, a low melting methylene nitrile such as acrylonitrile or methacrylonitrile, when such does not have a poisoning influence on the catalyst. The reaction is preferably carried out in the presence of a solvent, such as liquid ethylene or liquid ethane. When a solid Friedel-Crafts type metal halide catalyst, such as aluminum chloride or aluminum bromide, is used it is also preferred that it be dissolved in an inert solvent, such as ethyl chloride. The reaction mixture should be maintained thoroughly mixed and at the end of the desired extent of polymerization the reaction can be quenched by the addition of material to kill the activity of the catalyst, such as ammonia, an alcohol, an ether, or a ketone, or the like.

As will be appreciated by those skilled in the art, the above-described procedure is similar to that which is well known for the production of so-called "butyl rubber" wherein a low-boiling tertiary-base olefin and a minor amount of a diolefin hydrocarbon are reacted at low temperatures in the presence of a Friedel-Crafts type metal halide catalyst. Either batch, semibatch, or continuous processes may be used.

Polymerization of polymerizable vinylcyclopropanes in the presence of Friedel-Crafts catalysts is claimed in my copending application Serial No. 170,063 filed June 23, 1950, which is a continuation-in-part of the present application.

In another embodiment of my invention a polymerizable vinylcyclopropane is reacted with itself or with other polymerizable unsaturated organic compounds in aqueous emulsion. There are several classes of materials which can take part in such reactions, as will now be briefly discussed.

One class of materials is that represented by styrene and its homologues and analogues. Preferred reactants are styrene, vinylnaphthalene, vinyltoluene, vinylmethylnaphthalene, vinylchlorobenzene, and the like. It is preferred that such reactants contain not more than 14 carbon atoms per molecule, and in most instances the simpler materials, such as styrene, vinyltoluene and the like, will be used. Preferred products are produced when the molar ratio of polymerizable vinylcyclopropane to such vinyl aromatic compounds is between about 1:1 and about 9:1, inclusive. The reaction is carried out in the presence of an aqueous medium and a polymerization catalyst, together with suitable polymerization initiators, emulsification agents, and reaction modifiers, as is well known to the art in producing synthetic rubbers of the GR-S type. At the end of a desired extent of reaction the reaction can be stopped by the addition of a suitable material to kill the catalyst, such as phenyl-beta-naphthylamine.

Another type of reactant which can be employed along with a polymerizable vinylcyclopropane in emulsion polymerization is a material having the structure of a low-boiling conjugated diolefin, such as 1,3-butadiene, isoprene, one of the piperylenes, chloroprene (2-chloro-1,3-butadiene), chloroisoprene, and the like, preferably having not more than 7 carbon atoms per molecule. When such a material is used the molar ratio of polymerizable vinylcyclopropane to di-olefin hydrocarbon is preferably between about 10:1 and about 1:10, inclusive. The reaction is carried out in aqueous emulsion under conditions similar to those well known to those skilled in the art.

Another reactant which can be employed in accordance with this invention is a low-boiling alpha-methylene nitrile, such as acrylonitrile, methacrylonitrile, ethacrylonitrile, butacrylonitrile, alpha-chloroacrylonitrile, alpha-methoxymethylacrylonitrile, alpha-chloroethylacrylonitrile, alpha-phenylacrylonitrile, alpha-cyclohexylacrylonitrile, or, in general, any nitrile having a methylene group, $CH_2=$, attached to a carbon atom alpha to a nitrile group as in the structure,

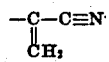

regardless of the nature of the radical to which this structure is connected. It is preferred that such a reactant have not more than 10 carbon atoms per molecule and that the ratio of polymerizable vinylcyclopropane to alpha-methylene nitrile between about 1:1 and about 9:1, inclusive. The reaction conditions will be similar to those used in the art to produce Perbunan-type synthetic rubbers, i. e., co-polymers of butadiene and acrylic acid nitrile.

Still another embodiment of my invention involves the emulsion copolymerization of a polymerizable vinylcyclopropane with acrylic acid, or a homologue or derivative, particularly its alpha-substituted derivatives, such as alpha-methacrylic acid and esters of such acrylic acid. It is preferred that the materials of this type which are employed in the practice of this invention contain not more than 10 carbon atoms per molecule and that the molar ratio of polymerizable vinylcyclopropane to such a reactant be between about 1:1 and about 9:1, inclusive. Again, the reaction conditions employed for such embodiments of my invention will be similar to those employed in the art where low-boiling di-olefins are reacted with such materials.

In such emulsion polymerizations it is to be understood that various combinations of reactants may be employed. Thus, more than one polymerizable vinylcyclopropane can be employed, more than one butadiene hydrocarbon, or derivative, may be employed, or more than one representative of the other classes of reactive materials discussed herein, or representatives of more than one of such classes of reactants may be employed. Thus, desirable products are produced by copolymerizing vinylcyclopropane, butadiene and acrylonitrile, by copolymerizing vinylcyclopropane, acrylonitrile and methyl acrylate, by copolymerizing vinylcyclopropane, styrene, and methyl acrylate and by copolmerizing other mixtures of reactants, as discussed herein. In each instance products having unique properties are produced and it is not to be construed that equivalent products are produced from different reaction mixtures.

In such emulsion polmerizations it is preferred to employ a reaction temperature between about 50 and 200° F. It is also preferred that a greater amount of the aqueous medium be employed than the amount of total reactants employed. The same type of emulsifying agents and reactors can be employed as are known to be used in the production of various synthetic rubbers. The polymerizations can be conducted at atmospheric pressure, but will be preferably conducted at a superatmospheric pressure sufficient to maintain reactants in liquid phase under the reaction conditions. Suitable reaction times will be readily found by a simple trial for each set of reaction conditions, the reaction conditions including not only reactants, ratio of reactants to each other, ratio of total reactants to emulsifying medium, pressure, and temperature, but also catalyst employed, degree of agitation, polymerization initiator, polymerization modifier, and the like. Preferred catalysts will be those having oxidizing characteristics such as have been used for the production of other types of synthetic rubbers. Said catalysts are broadly known in the art as peroxide polymerization catalysts. Batch, or semibatch, or continuous polymerization may be employed, as desired or as available facilities permit.

The preceding discussion covers the preferred embodiment of my invention, but it is to be understood that other embodiments of my invention can be practiced outside the the scope of the foregoing discussion. A vinylcyclopropane can be polymerized with itself, or preferably copolymerized with one or more of the foregoing comonomers, at atmospheric or elevated temperatures in the absence of emulsification media, in a so-called homogeneous state. Catalysts such as sodium may be employed to advantage, under conditions similar to those originally used to produce the buna-type rubbers. Other comonomers may be used, such as vinylacetylene, divinyl acetylene various non-hydrocarbon vinyl derivatives, as vinyl chloride, vinylidene chloride, vinyl acetate, etc.

It will be seen that all of the compounds herein mentioned as comonomers for polymerization in admixture with a polymerizable vinylcyclopropane are broadly defined as polymerizable vinylidene compounds.

Products of such polymerizations can be vulcanized, compounded, and otherwise modified, in manners similar to those used in treating other natural and synthetic rubber-like materials. Sulfur may be used as a compounding ingredient either in a small amount to effect vulcanization or in larger amounts to produce harder, less-elastic products. Carbon blacks, zinc oxide, plasticizers, fillers, and the like, may be added in known manners and amounts. In many instances the original polymerization can be carried out in the presence of such materials, especially in the presence of some of the carbon blacks.

My invention will be further illustrated and defined by the following examples.

Example I

A mixture of 85 parts by weight of isobutene and 15 parts of vinylcyclopropane is cooled to about $-112°$ F. in liquid ethane (300 parts). A solution of 1% aluminum chloride in ethyl chloride is sprayed into the cold solution while the mixture is vigorously stirred. After about 75% of the reactants have reacted, ammonia is added to kill the catalyst and the polymer separated, brought to room temperature, and washed free from impurities. The polymeric product is a solid elastic material similar to butyl rubber, and may be vulcanized, although not quite as readily as if isoprene or piperylene had been used.

Example II

Vinylcyclopropane, butadiene and styrene are copolymerized by vigorous agitation of the following mixture, under conditions such that an emulsion is established and maintained.

| Component | Parts by Weight |
|---|---|
| Vinylcyclopropane | 38 |
| 1,3-Butadiene | 37 |
| Styrene | 25 |
| Tertiary Dodecyl mercaptans | 0.28 |
| Potassium persulfate | 0.30 |
| Soap | 5.0 |
| Water | 180 |

The polymerization is carried out at about 122° F. for about 12 hours. The resulting latex is inhibited by addition of a small amount of phenyl-beta-naphthylamine and is then coagulated with a solution of aluminum sulfate. The resulting polymer, after washing and vulcanization with sulfur, is more stable to atmospheric oxidation than the vulcanized polymer produced under comparable conditions when polymerizing a mixture containing 75 parts 1,3-butadiene and 25 parts styrene.

Example III

Vinylcyclopropane and styrene are copolymerized under conditions recited in Example II, except that no butadiene is used and the amounts of comonomers are 70 parts vinylcyclopropane and 30 parts styrene. The resulting latex is inhibited and coagulated, and the polymer is washed and vulcanized, using the following recipe.

| Component | Parts by Weight |
|---|---|
| Polymer | 100 |
| Carbon black (furnace type) | 50 |
| Zinc Oxide | 3 |
| Asphalt #6 (a petroleum tar) | 6 |
| Accelerator (a condensation product of mercaptobenzothiazole and cyclohexylamine) | 0.8 |
| Sulfur | 1.75 |

After compounding, the sample is vulcanized at about 280° F. for about 45 minutes. On testing, the elongation, abrasion resistance, permanent set, hysteresis temperature rise, and other physical properties indicate that the product is of good quality.

Example IV

A copolymer of vinylcyclopropane and methylmethacrylate is formed by maintaining the following mixture emulsified, by mechanical agitation, at a temperature of about 130° F. for about 12 hours.

| Component | Parts by Weight |
|---|---|
| Vinylcyclopropane | 65 |
| Methylmethacrylate | 35 |
| Diisopropyl dixanthogen | 0.6 |
| Aqueous hydrogen peroxide (3.5%) | 10.0 |
| Sodium ferri pyrophosphate | 1.0 |
| Soap | 7.0 |
| Water | 250 |

The resulting material is a latex resembling other synthetic rubber latexes and, when suitably inhibited, can be put to similar uses. A plastic rubbery mass is obtained by addition of phenyl-beta-naphthylamine and subsequent coagulation. This material, when vulcanized with sulfur, is elastic and resistant to solvent action of such solvents as aromatic hydrocarbons and acetone.

It will be appreciated that numerous specific modifications of my invention may be practiced

I claim:

1. A process for making a polymeric hydrocarbon material of high molecular weight, which comprises polymerizing in aqueous emulsion a mixture comprising vinylcyclopropane and styrene in the presence of a peroxide polymerization catalyst.

2. A process for making a polymeric material of high molecular weight, which comprises polymerizing in aqueous emulsion a mixture comprising vinylcyclopropane and acrylonitrile in the presence of a peroxide polymerization catalyst.

3. The process of claim 9 wherein said compounds are vinylcyclopropane and acrylonitrile and the molar ratio of vinylcyclopropane to acrylonitrile is between 1:1 and 9:1, inclusive.

4. The process of claim 9 wherein said vinylidene compound is styrene, and a material having the structure of a low-boiling conjugated diolefin is included in the reaction mixture.

5. A method of making a polymeric hydrocarbon material of high molecular weight, which comprises copolymerizing, in aqueous emulsion, vinyl cyclopropane and styrene in a weight ratio of 7:3 at a temperature of about 122° F. and in the presence of potassium persulfate as catalyst and in the presence of a dodecyl mercaptan, and recovering a resulting polymeric material.

6. A method of making a polymeric material of high molecular weight, which comprises copolymerizing vinylcyclopropane and styrene, in a molar ratio between 1:1 and 9:1 inclusive, in an aqueous emulsion at a reaction temperature between about 50 and about 200° F. in the presence of a peroxide polymerization catalyst, and recovering a resulting polymeric material.

7. A method of making a polymeric material of high molecular weight, which comprises copolymerizing vinylcyclopropane and styrene, in a molar ratio between 1:1 and 9:1 inclusive, in an aqueous emulsion in the presence of a peroxide polymerization catalyst, and recovering a resulting polymeric material.

8. A process for producing high molecular weight materials which comprises polymerizing vinylcyclopropane in an aqueous medium in the presence of a peroxide polymerization catalyst.

9. A process which comprises polymerizing in an aqueous medium in the presence of a peroxide polymerization catalyst and at a polymerization temperature between 75 and 200° F. a compound of the general formula

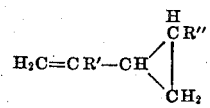

wherein R' is one of the group consisting of hydrogen, methyl, and chlorine, and wherein R'' is one of the group consisting of hydrogen, methyl, and ethyl, and a polymerizable vinylidene compound.

10. A process for producing high molecular weight materials which comprises polymerizing vinylcyclopropane in the presence of a peroxide polymerization catalyst.

11. A process for producing high molecular weight materials which comprises polymerizing a compound of the general formula

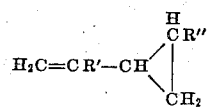

wherein R' is one of the group consisting of hydrogen, methyl, and chlorine, and wherein R'' is one of the group consisting of hydrogen, methyl, and ethyl, in the presence of a peroxide polymerization catalyst.

JEAN P. JONES.

REFERENCES CITED

The following references are of record in the file of this patent:

UNITED STATES PATENTS

| Number | Name | Date |
|---|---|---|
| 2,366,328 | Fryling | Jan. 2, 1945 |

OTHER REFERENCES

Demjanow, pp. 2718–2723, Ber. der deutsche Chemische gesellschaft, 1922.

Certificate of Correction

Patent No. 2,540,949                                                                                   February 6, 1951

JEAN P. JONES

It is hereby certified that error appears in the printed specification of the above numbered patent requiring correction as follows:

Column 1, lines 35 to 39, for the formula reading

column 4, line 23, after the word "nitrile" insert *be*; and that the said Letters Patent should be read as corrected above, so that the same may conform to the record of the case in the Patent Office.

Signed and sealed this 5th day of June, A. D. 1951.

[SEAL]

THOMAS F. MURPHY,
*Assistant Commissioner of Patents.*